Feb. 6, 1973   J. S. MAYELL   3,715,238

METHOD OF MAKING A POROUS CATALYTIC ELECTRODE

Filed March 20, 1969   2 Sheets-Sheet 1

INVENTOR.
JASPAL S. MAYELL
BY Gordon L. Hoef

ATTORNEY

United States Patent Office 3,715,238
Patented Feb. 6, 1973

3,715,238
METHOD OF MAKING A POROUS
CATALYTIC ELECTRODE
Jaspal Singh Mayell, Stamford, Conn., assignor to
American Cyanamid Company, Stamford, Conn.
Filed Mar. 20, 1969, Ser. No. 808,890
Int. Cl. H01m 13/04
U.S. Cl. 136—120 FC                 7 Claims

ABSTRACT OF THE DISCLOSURE

A catalytic electrode which comprises a metal catalyst such as rhodium or ruthenium and a second metal such as platinum or palladium is improved by electrolytic treatment using repeated triangular voltage sweeps. Improvement in catalytic activity of fuel electrodes is detailed.

---

Figure 1:
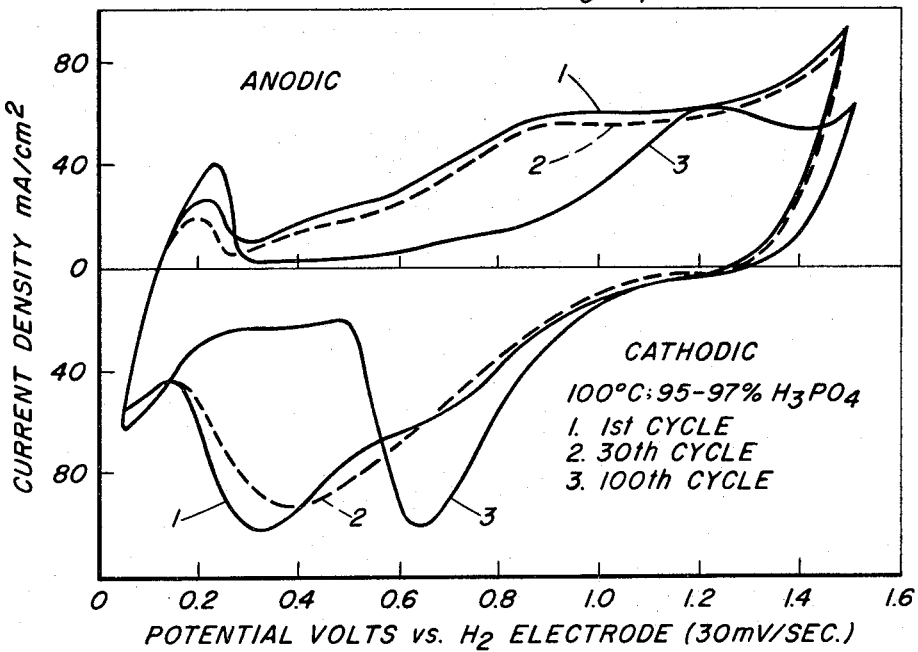

The invention relates to electrochemistry and particularly to improvements in porous catalytic electrodes for use in a fuel cell or in other cells having porous catalytic electrodes. It is known to employ such an electrodes that comprises catalytic metal for catalyzation of either a fuel oxidation reaction at a fuel electrode in a fuel cell or of a cathode depolarization reaction by an oxidizing gas in a fuel cell or metal air battery.

An object of the invention is to increase catalytic activity for these electrode reactions per unit weight of catalytic metal present in a catalytic fuel cell electrode. As a result of the invention, a catalytic electrode having a desired value of catalytic activity in its fuel cell function can be prepared using an amount of a selected catalytic metal considerably smaller than the amount of that metal that would be needed for a similar catalytic activity without the process of the invention.

These and other objects are achieved by electrolytic treatment of an electrode during manufacture of the electrode. The electrode to be treated comprises the selected catalytic metal and a second metal, both in finely divided form dispersed in the electrode structure.

The drawings are graphic plots of electrode performance during electrolytic treatment which consists of a series of triangular voltage sweeps applied to the electrode as a working electrode in an electrolysis cell. The treatment is carried out with the catalytic surface of the electrode in contact with a selected electrolyte. Apparatus for the voltage sweep treatment further comprises a counter electrode contacting the electrolyte in the cell, a reference electrode, and potentiostatic means for applying variable potential through the cell with constant rate of change of electrode potential at the working electrode. The potential is alternated regularly according to a triangular wave form having a selected frequency in the range from .001 to .03 cycle per second and having amplitude selected to include both the oxidation peak and the reduction peak voltages for the catalytic metal. In preferred embodiments amplitude of the cycle will be in the range from about 1.3 to about 1.5 volts. The rate of change of electrode potential, with respect to the reference electrode, is constant, usually at a value in the range from about 3 to about 100 millivolts per second. For the purpose of regulating electrode potential at a constant rate of change one may employ a potentiostat driven by a low frequency function generator. Repetitive cycles of such triangular potential sweeps applied to the electrode as described gradually change the catalyst surface properties of the electrode and this is used to optimize performance of the electrode in a fuel cell.

In preparing an electrode for treatment according to the process of the invention there is dispersed in the electrode structure a catalytic metal in finely divided form. This may be a catalyst for a fuel cell electrode reaction e.g. catalyst for anodic oxidation of fuel (e.g. hydrogen) at the fuel-electrolyte interface or catalyst for cathode depolarization by an oxidizing agent (e.g., oxygen) at the oxidizer-electrolyte interface in a fuel cell electrode. Examples of such catalytic metals that may be incorporated in the electrode according to the invention are ruthenium and rhodium.

A second metal, also dispersed in finely divided form in the electrode to be treated, is a metal that serves the principal function according to the invention of providing additional surface sites in the electrode for electrodeposition of catalytic metal reduced from solution during each voltage cycle. This second metal must remain insoluble in the selected electrolyte during the voltage cycles and if the second metal is oxidized in the voltage cycle it must remain insoluble in its oxidized state. Specific metals suitable for the second metal are platinum and palladium, for example.

The electrolyte for the cell in which the electrode is to be treated is an electrolyte solution in which the catalytic metal is essentially insoluble in its elemental state but is at least slightly soluble in its oxidized state and one in which the second metal will remain insoluble during each voltage sweep. Selection of an electrolyte solution for the treatment will depend upon the metals selected for use in the electrode. For systems involving combination of platinum or palladium with ruthenium or rhodium, suitable electrolyte solutions may include any acid or alkaline electrolytes, at various concentrations. In preferred embodiments we prefer to employ concentrated phosphoric acid or concentrated sulfuric acid electrolyte solutions.

In the voltage sweep process the electrode goes through an anodic period then through a cathodic period during each cycle. That is, during each cycle the electrode functions in the cell, with respect to the counter electrode, first as an anode then as a cathode as electrode potential is changed at constant rate. During the anodic period a portion of the catalytic metal is oxidized and a portion of its oxide dissolves into the electrolyte. If the second metal, e.g. platinum, also goes through its oxidation peak in the anode period, some of the second metal will be oxidized but its oxide will not dissolve. During the cathode period, a portion of catalytic metal oxide from the electrolyte solution will be reduced and redeposited at available reduction sites in the electrode. Any of the second metal previously oxidized will be reduced in situ during the cathode period of the cycle. Gradually, as the series of voltage sweeps proceeds, catalytic metal is being deposited at new surfaces so the catalytic metal surface area is gradually increasing. This will increase catalytic activity of the catalyst metal when the electrode is used in a fuel cell. But the rate of new catalytic surface area formation is gradually decreasing as more and more of the available surface area sites for new deposits are used. Another rate limiting factor is the gradual net loss of catalytic metal from the electrode to solution with each additional voltage sweep, due to diffusion of the metal oxide into the electrolyte solution. In early cycles of the series of the gain of catalytic activity due to increase of catalytic metal surface area more than offsets the loss of catalytic activity due to incremental losses of catalytic metal from the electrode to solution. Eventually however, a point is reached where the reduction of activity by incremental loss of catalytic metal to solution outweighs the gain of activity by new catalytic metal surface area developed during each cycle. From that point, any further cycling will only result in decrease of catalytic activity. Thus, for any given process conditions there will be found an optimum number of cycles beyond which further cycling will only decrease catalytic activity. In the most preferred embodiments, the electrode is treated by a series of potential sweeps at or near this optimum number of cycles. However any treatment by triangular potential sweeps, that results in a net increase in catalytic activity as described is within the broader scope of the invention.

The invention is particularly useful for improving performance of an electrode to be used in a fuel cell for oxidizing fuel gas that contains electrode polarizing impurities. For example, catalytic effectiveness of an electrode is shown to be substantially improved for oxidizing a mixture of hydrogen and carbon monoxide, hydrogen being the preferred fuel of the mixture. It is known that for use with pure hydrogen fuel, platinum is an effective catalyst for the fuel electrode reaction in a fuel cell, but the platinum catalyst fuel electrode is rapidly polarized if the hydrogen fuel gas contains carbon monoxide even in small proportions. To overcome this, a catalytic noble metal such as rhodium or ruthenium has been combined with platinum in the electrode. These metals in simple mixture with platinum resist polarization by carbon monoxide sufficiently to permit operation of the cell at more tolerable depolarization values. Now we have found the voltage cycling treatments improves the catalytic activity, i.e. reduces polarization more than can be obtained with any combination of the same metals not using the voltage cycling treatments.

Following are detailed descriptions of specific examples embodying the best mode presently contemplated of carrying out the invention. Full scope of the invention may include other embodiments not specifically described in these examples.

EXAMPLE 1

A mixed precipitate of platinum-ruthenium black is prepared by dissolving 10 gm. chloroplatinic acid ($H_2PtCl_6 \cdot 6H_2O$) and 2.36 gm. ruthenium chloride ($RuCl_3$) in water and reducing the compounds to the respective metals by means of sodium borohydride added to the solution. Weight of the co-deposited platinum and tantalum screen and dried. The colloidal alumina is efficiency of 85%. The black consists of about 20% by weight ruthenium and 80% platinum. With 245 mg. of the platinum-ruthenium black, there is blended 62 mg. graphite, 129 mg. colloidal alumina and 0.06 mg. of 60% aqueous colloidal suspension of polytetrafluoroethylene. The mixture is spread evenly on 24.5 $cm.^2$ of 50 mesh tantalum screen and dried. The colloidal alumina is leached with 5 normal $H_2SO_4$ at 75° C. for about two hours. After several washings in clean water the electrode is completely dried and ready for use. This electrode has 10 $mg./cm.^2$ of platinum-ruthenium black (80:20 weight ratio, respectively), 2.5 $mg./cm.^2$ graphite and 1.5 $mg./cm.^2$ polytetrafluoroethylene. A circular electrode of 1 3/16 inch diameter is cut from the electrode sheet prepared above and is then pressed in a hot press at 300° C. for 3–5 minutes with 100 $lb./in.^2$ pressure against a porous polytetrafluoroethylene backing sheet to make a laminated electrode. This two layer electrode is permeable by gas but is only partially permeable by the liquid electrolyte. The electrode is arranged at the end of a tubular electrode holder with an area of 5 $cm.^2$ of the catalytic side of the electrode exposed outside the tube to the electrolyte. The tantalum screen of the electrode is welded to a wire leading through the inside of the tube for outside electrical connection. The tubular electrode holder has means for exposing the back of the electrode inside the tube to fuel gas which is circulated through the tubular electrode holder. The electrolyte for the test cell and the reference electrode are the same; in this example, concentrated phosphoric acid. The hydrogen reference electrode, maintained at room temperature, is connected into the electrolysis cell by means of a Luggin capillary placed close to and facing the working electrode. Temperature of the electrolysis cell is maintained at 100° C. All potentials reported have been corrected by subtracting 30 mv. due to the temperature and concentration gradients. The counter electrode in the cell is a platinum gauze spot-welded with a platinum wire leading to outside electrical connections.

For test purposes fuel cell performance of the electrode is simulated in the same cell apparatus described above by circulating pure hydrogen through the electrode holder tube while applying a predetermined constant electrode potential at the working electrode by means of a potentiostat and recording the current after 2–3 minutes operation. Then hydrogen containing 3–10% carbon monoxide is circulated instead of pure hydrogen and it is found that a higher electrode potential must be applied to obtain the same current density. The difference in the compared potentials is the measure of polarization of the electrode by carbon monoxide poisoning. The results tabulated in Table I show this difference in compared potentials obtained using the untreated electrode first with pure hydrogen and then with impure hydrogen having 3–10% carbon monoxide at current density of 100 $ma./cm.^2$ in phosphoric acid at 100° C.

For treatment of the electrode, the potentiostat is driven by a low frequency function generator to regulate the potential of the electrolytic cell in a manner such that the working electrode potential, as measured against the reference electrode, changes from 0.05 volt to 1.50 volts and then back to 0.05 volt at a constant rate of change. A constant rate is selected in the range from 3 to 100 mv./sec. In this example the rate is 30 mv./sec. Gas circulated to the gas side of the electrode during the potential sweeps is nitrogen.

After the voltage sweep treatment, the apparatus is again operated as a simulated fuel cell by circulating to the fuel electrode first pure hydrogen and then contaminated hydrogen, while applying constant potential and measuring the current density as before to determine differences in polarization of the electrode by the respective fuels. In Table I are tabulated the potential differences observed using pure hydrogen then 3% carbon monoxide fuel and using pure hydrogen then hydrogen mixed with 10% carbon monoxide. Tabulated results were obtained with an original untreated electrode, then with the same electrode after treatment with 30 potential sweeps. The data demonstrates improved performance of the treated electrode in terms of a reduction in electrode potential caused by carbon monoxide poisoning.

During the potential sweep treatment described above, a graphic plot is made recording changes in current density at the working electrode as the electrode potential of the working electrode is changing (FIG. 1). Analysis of this graph gives an insight into the electrode mechanisms which may account for the observed improvement in performance of the fuel cell electrode. In the first sweep, oxidation and reduction peaks for both ruthenium and platinum are observed on the current-potential curves. For each successive sweep there is a decrease in the platinum oxidation and reduction peaks and increase in the ruthenium peaks. This indicates increased surface activity of ruthenium and reduced surface activity of the platinum during the first 30 voltage sweeps. If the number of sweeps is continued past the optimum, the catalytic performance of the treated electrode gradually deteriorates. After 103 sweeps, platinum peaks have reappeared and ruthenium peaks have disappeared, see curve 3, FIG. 1 indicating regression toward the original catalytic activity. At the same time the electrolyte solution has become colored, due to dissolution of ruthenium oxide from the electrode into the electrolyte solution during the anodic part of the voltage sweeps. This accounts for disappearance of the ruthenium peaks in the current-potential curve.

TABLE I

Electrode:
- Percent Ru .................................... 20
- Percent Pt .................................... 80

3% CO:
- Original electrode ..................... mv.. 35
- Electrode after 30 potential sweeps ..... mv.. 8
- Electrode after 103 potential sweeps .... mv.. 265

10% CO:
- Original electrode ..................... mv.. 76
- Electrode after 30 potential sweeps ..... mv.. 35

EXAMPLE 2

Platinum-rhodium electrodes are made from physical mixtures of commercial platinum and rhodium blacks (each having surface area of at least 25 m.$^2$ per gram) made into electrodes by procedure similar to that described in Example 1, mixing and blending the noble metal blacks in a mixture with colloidal alumina and colloidal polytetrafluoroethylene and spreading the mixtures on 50 mesh tantalum screens, drying and then leaching out the colloidal alumina with sulfuric acid. These electrodes are compounded to have 15 mg./cm.$^2$ of platinum-rhodium and 3.3 mg./cm.$^2$ of polytetrafluoroethylene. In several electrodes, concentration of rhodium is varied from 0 to 100% as specified in Table II. The electrodes are cut to size, backed with porous polytetrafluoroethylene and assembled in an electrode holder the same as in Example 1. Polarization data is obtained by procedures detailed in Example 1. Electrodes are tested under simulated fuel cell conditions both before and after treatment with the voltage sweeps. Each electrode is tested using pure hydrogen fuel and tested again using hydrogen contaminated with 10% carbon monoxide.

Figure 2:
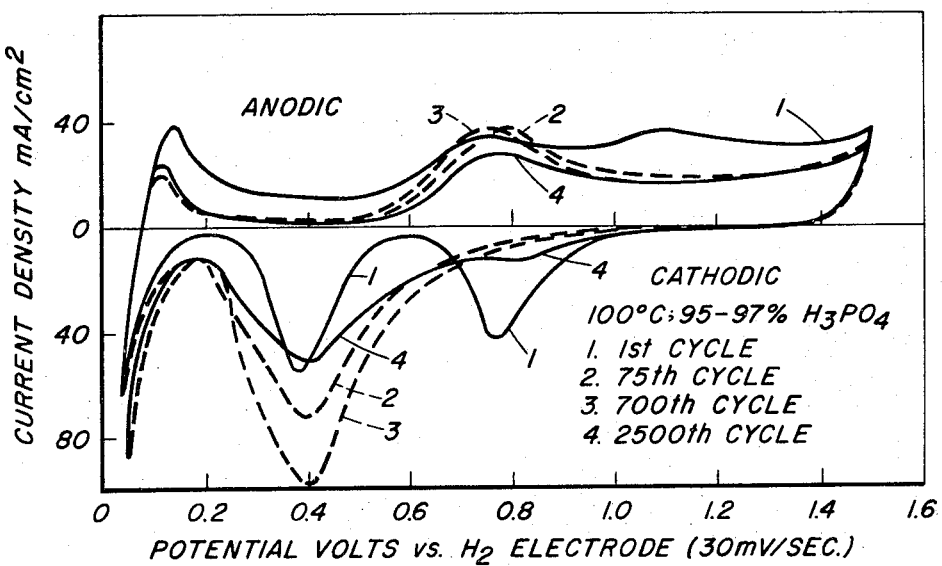

After the first test the electrodes are subjected to potential sweeps by changing potential at a linear rate from 0.05 volt to 1.50 volts and back to 0.05 volt. A constant sweep rate is 30 millivolts per second. Nitrogen is circulated to the fuel electrode. Results tabulated in Table II are shown for the original electrode tested before any voltage sweep treatment and for the same electrode tested again after 30 potential sweeps. The values tabulated show the difference in electrode potential (mv.) obtained by operating the test cell first with pure hydrogen and then with hydrogen having 10% carbon monoxide, tested at 100 ma./cm.$^2$ with concentrated phosphoric acid electrolyte at 100° C. Data are shown for tests of electrodes containing from 20% to 100% by weight rhodium expressed as percentage of the total present in the electrode. In another embodiment (not tabulated) the number of sweeps is increased beyond 30 using an electrode having 1:1 physical mixture of platinum and rhodium black and further improvement in performance is observed up to about 700 sweeps at which the optimum is reached for operation of this particular electrode using as fuel hydrogen contaminated with 10% carbon monoxide. FIG. 2 is a voltametric curve at 30 mv./sec. of the electrode having 15 gm./cm.$^2$ of platinum and rhodium black (1:1 physical mixture by weight) at 100° C. in 95–97% phosphoric acid, under nitrogen atmosphere. This curve shows even more definitely the changes described for Example 1.

TABLE II

| Electrode | | | |
|---|---|---|---|
| Percent Rh | Percent Pt | Original electrode | Electrode after 30 potential sweeps |
| 0 | 100 | Not possible | Not possible |
| 20 | 80 | 473 mv | 183 mv |
| 34 | 66 | 61 mv | 18 mv |
| 50 | 50 | 48 mv | 2 mv |
| 75 | 25 | 20 mv | 1 mv |
| 100 | 0 | 4 mv | 0 mv |

EXAMPLE 3

Figure 3:
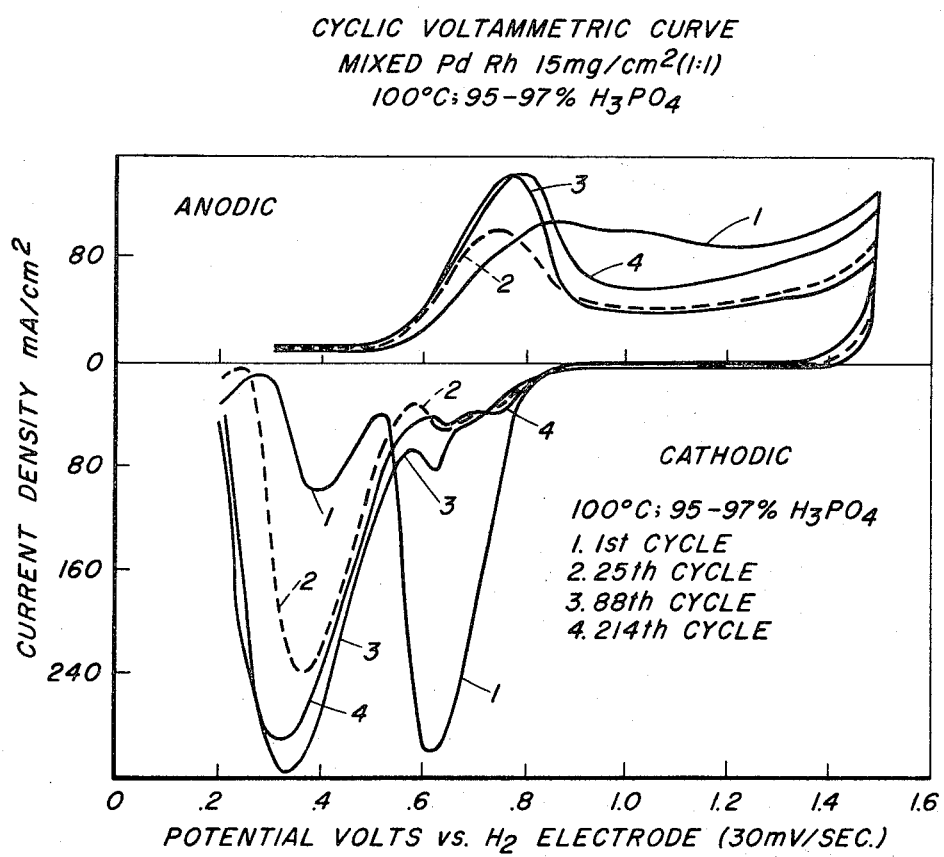

Results obtained with a physically mixed palladium black and rhodium black electrode are qualitatively similar to those obtained with the mixed platinum-rhodium electrode as discussed previously. As shown in FIG. 3, the intital twin peaks for palladium and rhodium are present, but with cycling the palladium reduction peak (at 0.63 v.) decreases leaving two small well-defined peaks (at 0.75 v. and 0.63 v.), which may be attributed to the reduction of two different oxides of palladium. The performance of the uncycled electrode on H$_2$ having 10% carbon monoxide at 100° C. in phosphoric acid is good and improves with cycling (to 25 cycles). However, after longer cycling (to 214 times), the polarization increases while the rhodium peaks decrease. Also during cycling a black precipitate, presumably due to the dissolution of palladium oxides, comes out of the electrode. FIG. 3 is a voltametric curve of the Example 3 electrode.

I claim:
1. A method for improving catalyst activity of a porous catalytic electrode, which electrode comprises a metal catalyst selected from ruthenium and rhodium and a second metal selected from platinum and palladium, both dispersed in particulate form in the electrode, said method comprising subjecting the electrode to a repetitive series of triangular electrode potential sweeps including in each sweep the oxidation and reduction potentials of said metal catalyst.
2. A method defined by claim 1 wherein the frequency of said electrode potential sweeps is selected in the range from 0.001 to .03 cycle/second.
3. A method defined by claim 2 wherein the amplitude of said electrode potential sweeps is in the range of about 1.3 to 1.5 volts, as measured against a standard hydrogen reference electrode.
4. A method defined by claim 1 wherein said second metal comprises platinum.
5. A method defined by claim 1 wherein said metal catalyst comprises rhodium and said second metal comprises platinum.
6. A method defined by claim 1 wherein said metal catalyst comprises ruthenium and said second metal comprises platinum.
7. A method for making a catalytic fuel cell electrode comprising a selected catalytic metal, comprising the steps of
   (a) dispersing the selected catalytic metal with a second metal both in particulate form in said electrode.
   (b) subjecting the electrode so prepared, as a working electrode in an electrolyte cell, to repeated triangular electrode potential sweeps, each cycle of which includes both the oxidation and reduction peak voltages for said catalytic metal, the electrolyte of said cell being one in which said selected catalytic metal is insoluble in elemental state but at least slightly soluble in oxidized state and one in which the second metal is insoluble in both its elemental and oxidized states.

References Cited

UNITED STATES PATENTS

| | | | |
|---|---|---|---|
| 2,208,616 | 7/1940 | Wellman et al. | 204—130 |
| 2,678,909 | 5/1954 | Jernstedt et al. | 204—45.9 |
| 3,207,682 | 9/1965 | Oswin et al. | 136—86 |
| 3,276,976 | 10/1966 | Juliard | 136—120 X |
| 3,300,345 | 1/1967 | Lyons, Jr. | 136—86 |
| 3,355,326 | 11/1967 | Semones et al. | 136—120 |
| 3,436,271 | 4/1969 | Cole et al. | 136—86 |

WINSTON A. DOUGLAS, Primary Examiner

M. J. ANDREWS, Assistant Examiner

U.S. Cl. X.R.

204—130

UNITED STATES PATENT OFFICE
CERTIFICATE OF CORRECTION

Patent No. 3,715,238    Dated February 6, 1973

Inventor(s) JASPAL SINGH MAYELL

It is certified that error appears in the above-identified patent and that said Letters Patent are hereby corrected as shown below:

Column 1, line 23, delete "electrodes" and substitute -- electrode -- .

Column 2, line 61, delete "of" second occurrence.

Column 3, line 44, delete "tantalum screen and dried. The colloidal alumina is" and substitute -- ruthenium black after washing and drying is 4.18 gm. with -- .

Signed and sealed this 3rd day of July 1973.

(SEAL)
Attest:

EDWARD M. FLETCHER, JR.
Attesting Officer

Rene Tegtmeyer
Acting Commissioner of Patents